United States Patent Office 3,652,757
Patented Mar. 28, 1972

3,652,757
METHOD FOR INJECTION MOLDING OF MULTI-LAYER SOLES OF ELASTOMERS ONTO UPPERS OF A SHOE
Karl-Heinz Wessel, Vlotho, and Erich Sabadello, Bad Oeynhausen, Germany, assignors to Firma Stubbe Maschinenfabrik G.m.b.H., Kalletal-Kalldorf, Germany
Filed Aug. 14, 1968, Ser. No. 752,608
Claims priority, application Germany, Oct. 20, 1967, St. 27,488
Int. Cl. B29h 3/08
U.S. Cl. 264—244                            1 Claim

ABSTRACT OF THE DISCLOSURE

A method of injection molding a multilayer sole of elastomers onto an upper of a shoe by means of a multipart mold which includes a last carrying the upper of the shoe. Side cheeks are movable relative to each other and a sole plate is displaceable relative to the last. The sole plate provided with a sprue channel, extending in the longitudinal direction of the sole plate, and further provided with a plurality of junction channels distributed along the length of the sprue channel and terminating in a hollow space of the mold. The method comprises the steps of injecting elastomer material for a first sole layer into the hollow space of the mold upon enlarging the hollow space by displacement of the sole plate, without filling up completely the hollow space. The elastomers are distributed over the length of the sole plate in dependence upon the number of the junction channels chosen. The cross-sections of the junction channels and the injection speed relative to each other, are adjusted such, that the distribution takes place in quantities of said elastomer material required for the formation of the toe end, the heel end and the center part of that sole layer, respectively. The elastomer material is pressed onto the upper of the shoe by slow displacement of the sole plate towards the last. A sole layer is formed by slow build-up of a pressure in the hollow space of the mold, and by injecting thereafter again elastomer material into the enlarged hollow space of said mold, a second sole layer is formed by renewed slow displacement of the sole plate towards the last.

---

Figure 1:
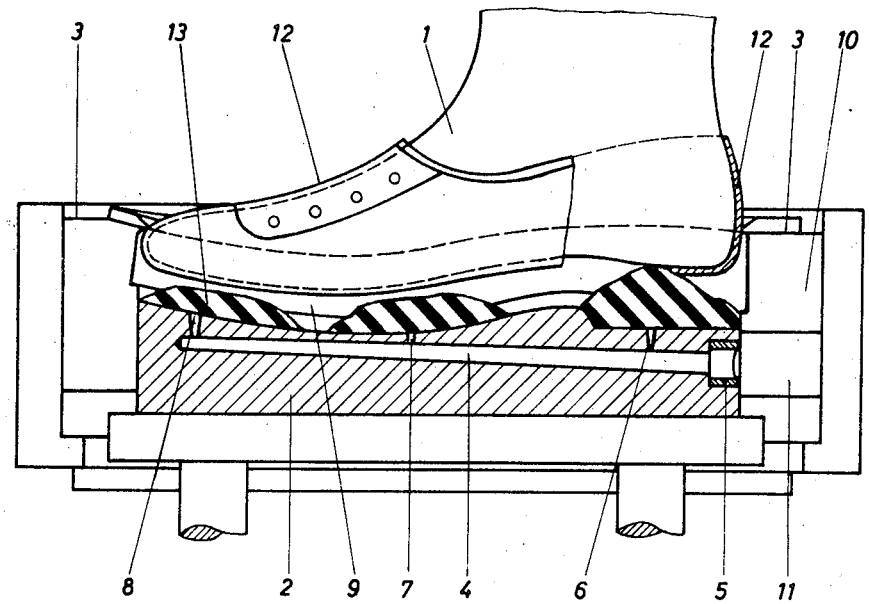

The present invention relates to a method of injection molding of a multi-layer sole of elastomer material onto an upper of a shoe. The term shoe or boot, as used herein and in the claim, means any article of footwear comprising an upper and a sole. The term sole is construed to include also the heel.

Rubber-like material is called elastomers, which are expandable and deformable by pressure or pull and return again into their original form. For instance, all synthetic caoutchoucs belong to this group. If reference is made below, for the sake of simplicity, shortly to caoutchouc or rubber, generally elastomers are referred to.

It is known to produce shoes with a rubber sole in such manner that the sole is injection molded onto the upper of the shoe. For different reasons, the requirement has resulted to build up the shoe sole of a plurality of different layers, which consist of different elastomer materials. For instance, an upper layer of a soft material may be desirable for a satisfactory bedding of the foot, while the lower layer should have a greater hardness or a higher abrasion rigidity or should consist of a particularly slide-fast material. Simultaneously or independently from the previously mentioned different material characteristics of the sole layers, the desire has been created to produce soles of layers in different colors. To the quality of a sales-ripe shoe with a multi-layer sole, first of all the requirements are made that the sole and its individual layers are completely formed and have no locations on which material is missing, that no air bubbles are contained in the sole, that the layers of the sole are well-glued together with each other and, first of all, that no mixtures of the different materials take place, so that an accurate and exact run of the separating line between the individual layers is brought about, which is particularly necessary in connection with multi-colored soles. With the methods known until now for injection molding of soles onto uppers of the shoe, it is not possible to produce multi-layer soles of elastomer materials which would satisfy these requirements.

For injection molding of soles of synthetic material or rubber onto uppers of a shoe, as is well-known, a multipart mold is used, which has a sole plate, a last, and side cheeks movable towards each other. The last carrying the upper of the shoe can thereby be liftable and lowerable or swingable, in order to make possible a comfortable mounting of the upper of the shoe and removal of the finished shoe. Also the sole plate can be arranged displaceable relative to the last between the side cheeks, in order to be able to vary the distance between the last and the sole plate and, thereby, for instance the thickness of the shoe to be produced. The hollow space of the mold, limited upwardly and downwardly by the last and the sole plate is closed up laterally by the side cheeks, which engage tightly the sole plate, as well as the last and the upper of the shoe mounted thereon, respectively and are movable relative to each other for the opening of the mold. The side cheeks grip over for one-half each the toe end and the heel end of the hollow space of the mold, so that the separating slit is disposed between the side cheeks, at the toe end and at the heel end. The previous mentioned parts of the mold are disposed in a mold closing device which has, in known manner, hydraulic cylinders or other devices for the movement of the mold parts.

The injection molding of the synthetic material or caoutchouc into the hollow space of the mold takes place by means of an injection molding unit through the separating slit of the side cheeks at the heel end or at the toe end. It is known thereby, to equip the faces of the side cheeks, disposed towards each other at the separating slit, with recesses, which form a sprue channel, the sprue inlet of which engages the injection nozzle of the injection molding unit, whereby directly through this sprue channel disposed in the side cheeks, injection molding into the mold takes place. It is also known to equip the sole plate with a sprue channel which extends in the longitudinal direction of the sole plate and from which junction channels lead into the hollow space of the mold, and which junction channels are distributed over the length of the sprue channel, whereby the injection nozzle projects through a recess in the separating slit of the side cheeks and engages at the sprue inlet of the sole plate.

A method of injection molding of a multi-layer, in particular of a two-colored sole of synthetic material on an upper of a shoe, is known which rests substantially on the same principal, which is applied generally for injection molding of two-colored parts of synthetic material. Corresponding with the number of the sole layers, two or more sprue channels are disposed in superposed position in the separating slit of the side cheeks, through which the material is injection molded in the above-stated manner directly into the heel end of the hollow space of the mold. For injection molding of the first sole layer, the sole plate is displaced so far towards the last, that only the upper sprue channel disposed closest to the last terminates in the hollow space of the mold and the other sprue channels are covered by the sole stamp and are closed. The synthetic material for the formation of the first sole layer is injection molded into the hollow space of the mold through the uppermost sprue channel. Thereafter the sole stamp is lowered to a point that the second sprue channel is opened and a new hollow space of the mold is created, into which the synthetic material for the formation of the second sole layer is injection molded through the second sprue channel. In this manner, successively sole layers can be injection molded to the previously prduced sole layer. This method is, however, only applicable for injection molding of multi-layer soles of synthetic material, and not, however, for the injection molding of multi-layer soles of elastomers, since synthetic materials and elastomers show during injection molding a very different behavior. Synthetic materials, as for instance the plasticized polyvinyl chloride, used many times for soles, are injection molded in their liquid state, have a good flow capacity and solidify during cooling, so that the synthetic material is well divided at relatively low operating pressures, and the sole layer is uniformly formed, from the heel end to the toe end of the hollow space of the mold. Accordingly, after at least partial solidification of the first sole layer, the second sole layer can be injection molded onto the first sole layer and can be well formed, without admixing of the synthetic materials of the two layers or deformation of the first sole layer by the synthetic material of the second sole layer, so that a two-colored or multi-colored sole with a clear and sharp separating line between the individual sole layers can be produced. Against this finding, caoutchouc appears to be during the injection molding viscous and doughy, has a bad flowing capacity and requires for vulcanization a heating step. If one may attempt, therefore, to injection mold a multi-layer sole of elastomers in accordance with the same method, the material would be deposited during each injection molding operation at the heel end of the hollow space of the mold and would dam up and it would not lead to a uniform distribution of the material, so that the sole at the toe is not completely formed. If one would increase the injection pressure, in order to distribute better the material and to press the same into the toe formation of the hollow space of the mold, the material would, particularly in the vicinity of the sprue, that means within the range of the heel end, squeeze into the separating slits of the mold between the two side cheeks, as well as between the side cheeks and the bottom plate, and escape through the separating slits. The material lost thereby constitutes an additional expense. Since the upper of the shoe should not be squeezed by the pressure with which the last is pressed towards the side cheeks, and also should not receive any pressure points, the above-stated material escape makes itself felt first of all on the separating slit between the last and the side cheeks, so that material above the sole sets down on the upper of the shoe and no clear connecting line between the upper of the shoe and the sole is brought about. Furthermore, the elastic first sole layer would be deformed and displaced during injection molding of the second layer by the viscously flowing material of the second layer, so that mixtures of the two materials occur and no non-objectionable clean and straight separating line is formed between the sole layers, which is an unavoidable presumption for a saleable product, as well as when using materials with different characteristics, as when using different colored materials.

Furthermore, a method of injection molding of soles of synthetic material or rubber onto an upper of a shoe has been proposed, in which an adhesive is provided for securing the soles to the upper of the shoe with which adhesive the edge of the upper of the shoe projecting into the hollow space of the mold is covered. In order to avoid the above-described material escape, the material should be injection molded at a comparatively low pressure into the hollow space enlarged by displacement of the sole plate. Shortly after complete filling of the mold, for the purpose of setting of the adhesive, the sole plate is pushed into the hollow space of the mold, that means, it is displaced towards the last and thereby the sole is pressed onto the upper of the shoe. Also in this method, the injection molding of the material takes place through the separating slit of the side cheeks at the heel end directly into the hollow space of the mold. Likewise, as the above-described method, is thus also this method suitable for injection molding of soles of synthetic masses; however, during injection molding of soles of viscous caoutchouc masses, the difficulties of a uniform distribution of the material from the heel end up to the toe end occur as in the above-described method. Also this method is only destined for injection molding of single layer soles. For injection molding of multi-layer soles, it is not destined and also not suitable, rather during the injection molding of the second layer, the same above-described mixtures of the caoutchouc masses and displacements of the first sole layer occur.

It was until now not possible to injection mold non-objectionable, multi-layer, particularly multi-colored soles of elastomers onto an upper of a shoe, which comply completely with the above mentioned requirements.

It is also an object of the present invention to provide a method for injection molding of multi-layer soles of elastomers onto uppers of shoes, which satisfy in every way the previously above-described requirements.

It is also an object of th present invention to provide a method for injection molding of multi-layer soles of elastomers onto uppers of shoes, which avoids the drawbacks of the known methods and makes possible the injection molding of multi-layer, particularly multi-colored soles of elastomers, which comply with the above-stated requirements.

It is another embodiment of the present invention to provide a method of injection molding of multi-layer soles of elastomers onto uppers of shoes, by means of a multi-part mold, which has a last carrying the upper of the shoe, side cheeks movable towards each other, as well as a sole plate displaceable relative to the last, which sole plate is equipped with a sprue channel extending in its longitudinal direction, as well as with junction channels distributed along the length of the sprue channel and terminating in the hollow space of the mold. The method, in accordance with the present invention, resides further in the fact, that the elastomer material for the first layer of the sole is injection molded into the hollow space of the mold enlarged by displacement of the sole plate such, that the hollow space of the mold is not completely filled up by the material, whereby the number of the junction channels leading from the sprue channel into the hollow space of the mold is chosen such and distributed over the length of the sole plate such, as well as the cross-sections of the junction channels and the injection speed are adjusted towards each other such, that the elastomer material is distributed in quantities required for the formation of the toe end, of the heel end and of the center part of the sole layer, respectively, on the sole plate, whereupon the elastomer material is pressed onto the upper of the shoe by slow displacement of the sole plate towards the last, such that by slow creation of a pressure in the hollow space of the mold, the sole layer is formed, and that thereafter the next sole layer is formed in the same manner by injection molding of elastomer material into the hollow space of the mold enlarged again by displacement of the sole plate and is formed by renewed slow displacement of the sole plate against the last.

Figure 2:
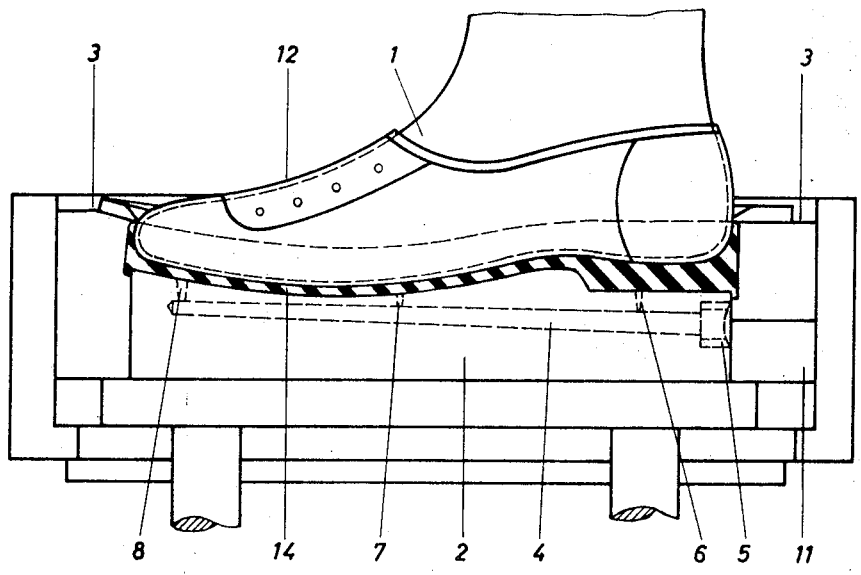
Figure 3:
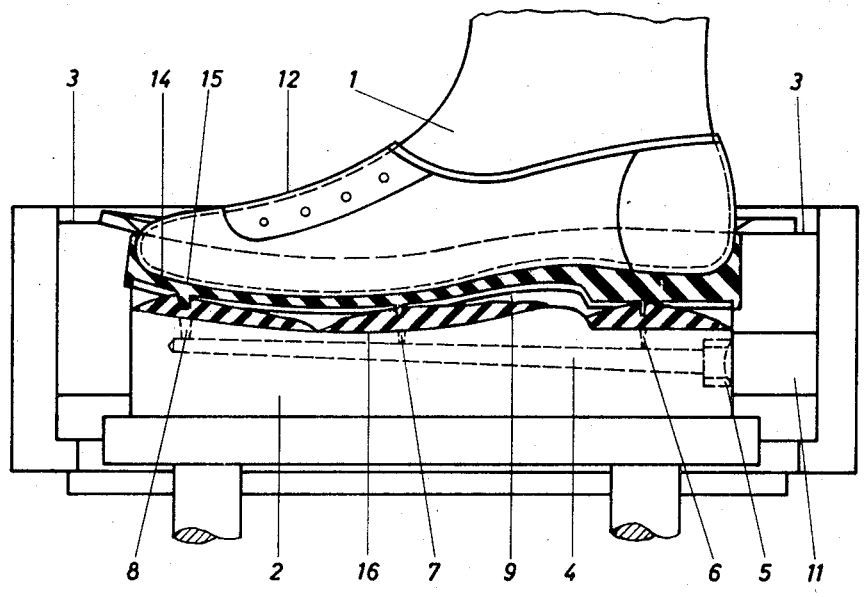
Figure 4:
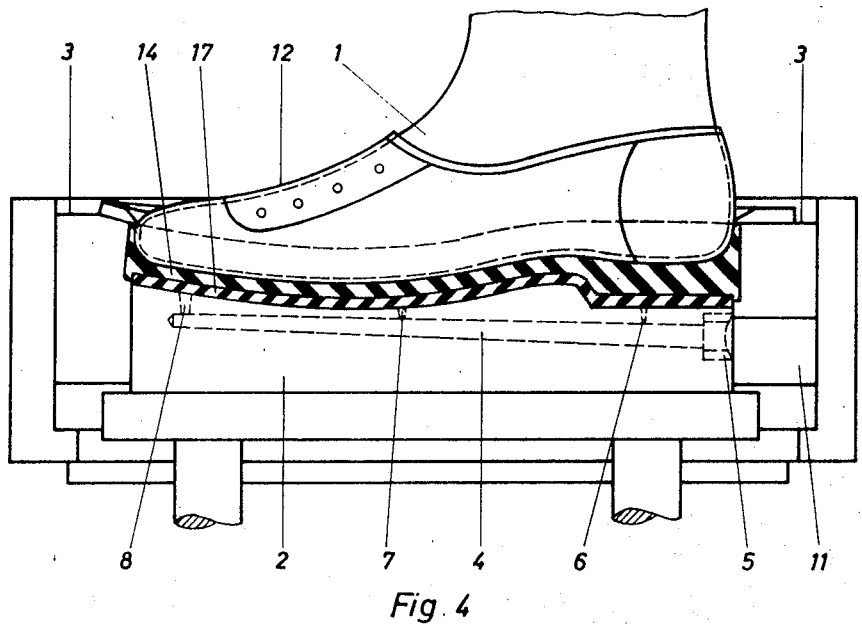

With these and other objects in view which will become apparent in the following detailed description, disclosing the present invention by example only, the present invention will be clearly understood in connection with the accompanying drawings, in which:

FIG. 1 is a vertical section of the apparatus operating in accordance with the method of the present invention and disclosing a first method step; and FIGS. 2, 3 and 4 are similar views disclosing different steps in the method of the present invention.

Referreing now to the drawings, and in particular to FIG. 1, the apparatus for injection molding of multi-layer soles of elastomers onto uppers of shoes comprises a multi-part mold including a vertically movable last 1, a sole plate 2 displaceable relative to the last 1 and two side cheeks 3 movable relative to each other. whereby the side cheek disposed in front of the plane of the drawing sheet is not shown.

A sprue channel 4 formed with a sprue inlet 5 and extending in the longitudinal direction of the sole plate 2 is arranged, the cross-section of the sprue channel 4 slightly conically reducing from the sprue inlet 5 to the other end of the sprue channel 4. Three junction channels 6, 7 and 8 are distributed over the length of the sprue channel 4, which junction channels terminate in the hollow space 9 of the mold, whereby the junction channels 6, 7 and 8 are widened from the sprue channel 4 to the hollow space of the mold 9. The faces 10 of the two side cheeks 3 arranged opposite each other on the heel end are provided with a semi-circular recess 11, so that the recesses 11 form in the closed position of the mold an opening in the separating slit of the side cheeks, through which opening the injection nozzle of an injection molding unit is inserted and can be set onto the sprue inlet 5. An upper 12 of the shoe is mounted on the last 1, onto which a multi-layer sole of elastomers is to be injection molded.

The elastomer material for the first layer of the sole is injection molded for this purpose such into the hollow space 9 of the mold enlarged by lowering the sole plate 2, that the hollow space 9 of the mold is not filled up completely by the injected caoutchouc mass 13 (FIG. 1). In this manner, it is avoided that a pressure is built up in the hollow space 9 of the mold, which could lead to an escape of the caoutchouc mass through the separating slits between the mold parts.

The number of the junction channels 6, 7 and 8 leading from the sprue channel 4 into the hollow space 9 of the mold is calculated and distributed over the length of the sole plate 2 such that a distribution of the caoutchouc mass 13 on the sole plate 2 is made possible in quantities required for the formation of the toe end, of the heel end and of the center part, respectively, of the sole layer. In this manner, it is avoided that a high pressure must be produced in the hollow space 9 of the mold, in order to produce a flow movement for distribution of the caoutchouc mass. The greater the number of the junction channels, the easier will be the distribution of the caoutchouc mass in the hollow space 9 of the mold. It has been shown that in shoes for grown-ups with normal shoe size, three junction channels suffice already, in order to make possible a sufficient distribution of the caoutchouc mass.

The above-stated measure alone does not lead, however, to the required distribution of the caoutchous mass, rather for this purpose the cross-sections of the junction channels and the injection speed have to be adjusted relative to each other. This measure rests on the following findings and considerations.

The flow qualities of the viscous doughy caoutchous masses cause a relatively strong reduction of the injection pressure in the sprue channel 4 from the sprue inlet 5 up to the other end of the sprue channel 4 due to friction losses. At equal size of the junction channels the caoutchouc quantities entering the hollow space of the mold would thus be the highest at the first junction channel 6 and be always smaller towards the last junction channel 8. If, thus, equal quantities of caoutchouc mass are to be injection-molded into the hollow space 9 of the mold through all junction channels, the first junction channel 6 must have the smallest cross-section and towards the junction channel 8, the cross-section of the junction channels must be continuously greater. As a rule, thus, the cross-sections of the junction channels from junction channel to junction channel are chosen greater from the sprue inlet 5 up to the other end of the sprue channel 4. However, deviations can result if, at the individual channels, very different quantities of caoutchouc masses are to be injected, for instance, if the sole should be very thin at the toe end, while at the heel end a very great heel should be formed. By corresponding measuring of the cross-sections of the junction channels, these conditions can be considered, so that the cauotchouc mass is distributed in required quantities on the sole plate for the formation of the toe end, the heel end and of the center portion, respectively, of the sole layer.

Since the flow characteristics of caoutchouc masses vary with the temperature and the viscosity, such variations can lead to a disturbance of the desired distribution of the caoutchouc mass in the hollow space 9 of the mold during the operation. If, for instance, at the toe end or at the heel end not sufficient material has been injected, then the toe end or the heel end is not completely formed, and if too much material is injected at one point, then a pressure can be created which leads to a material escape. It has now been found that also the injection speed influences the distribution of the caoutchouc mass in the hollow space 9 of the mold. Upon reduction of the injection speed, the injected quantity is increased at the junction channel 6 disposed closest to the sprue inlet 5 and is diminished at the junction channels 7 and 8, disposed more remote, while on the other hand, in case of an increase of the injection speed, the injected quantity is increased at the more remote junction channel 8 and is reduced at the closer disposed junction channels 7 and 6. Due to the variations of the injection speed, that means due to the fact that the cross-sections of the junction channels and the injection speed are adjusted relative to each other, variations of the flow characteristics, occurring by temperature- or viscosity-fluctuations, can be equalized or balanced out during the operation.

By the cooperation of the above-described measures, it is particularly brought about that the entire caoutchouc mass is distributed as quickly as possible on the sole plate 2 and is subjected as much as possible simultaneously to the heat effect required for the vulcanization, which is an essential presumption for qualitatively high valued products.

After the above-described injection of the caoutchouc mass, the latter is pressed by slow displacement of the sole plate 2 towards the last 1 to the upper 12 of the shoe such that, by the slow creation of a pressure in the hollow space 9 of the mold, the sole layer 14 is formed (FIG. 2). It has been found that a possibly slow pressure increase provides the possibility for the viscously flowing material to distribute itself such that a faultless forming of all parts of the sole layer 14 is brought about, without occurrence of an escape of materal on the upper 12 of the shoe or on another separating slit of the mold. The speed can amount, for instance, to 1 mm./sec. during the lifting of the sole plate. For instance, in a mold with a lift of the sole plate of 9 mm. for this lift a time period of 8 seconds has been used.

After the sole layer 14 has solidified sufficiently by partial vulcanization, so that it retains its shape, the sole plate 2 is again lowered (FIG. 3). The caoutchouc material, which has solidified in the junction channels 6, 7 and 8, tears at the point of the narrowest cross-section, namely directly on the sprue channel 4, is pulled out from the junction channels widening from the sprue channel 4 to the hollow space 9 of the mold and forms on the sole layer 14 small, soft naps 15 which are laid over during injection of the next sole layer and are pressed flat, so that it is not required to open the mold and to cut off the naps. The sprue body, which has solidified in the sprue channel 4, is pulled out in known manner from the conic sprue channel.

Now, in the same above-described manner in which the material has been injected for the first sole layer, the next caoutchouc mass 16 for the next sole layer is injected into the hollow space 9 of the mold. The caoutchouc mass 16 distributes in the enlarged hollow space 9 of the mold on the sole plate 2, without exerting a pressure or pull on the first sole layer 14, and thus without deforming the sole layer 14 or to cause a mixture of the two caoutchouc masses.

In the same above-described manner, in which the first sole layer 14 is pressed onto the upper of the shoe, the caoutchouc mass 16 is pressed onto the first sole layer 14 by slow displacement of the sole plate 2 and by the slow build-up of a pressure, the second sole layer 17 is formed, whereby the two sole layers 14 and 17 are glued together and a clean separating line between the two sole layers is created. In the same manner, also further sole layers can be injected under circumstances.

We claim:

1. A method of injection molding a multi-layer sole of elastomers onto an upper of a shoe by means of a multi-part mold, including a last carrying said upper of the shoe, side cheeks movable relative to each other and a sole plate displaceable relative to said last, said sole plate being provided with a sprue channel, extending in the longitudinal direction of said sole plate, and provided further with a plurality of junction channels distributed along the length of said sprue channel and terminating in a hallow space of said mold, comprising the steps of injecting elastomer material for a first sole layer into said hollow space of said mold enlarged by displacement of said sole plate, without filling up completely said hollow space, distributing said elastomers on said sole plate over the length of said sole plate in dependence upon the number of said junction channels chosen and adjusting the cross-sections of said junction channels and the injection speed relative to each other, that said distribution takes place in quantities of said elastomer material required for the formation of the toe end, the heel end and the center part of said sole layer, respectively, pushing said elastomer material onto said upper of said shoe without counter pressure into said hollow space and forming said sole layer by slow displacement of said sole plate towards said last and now for the first time by slow creation of a pressure in said hollow space of said mold, simultaneously reducing the cavity of said mold, enlarging thereafter again said hollow space of said mold by displacement of said sole plate, injecting again elastomer material into said enlarged hollow space of said mold, without filling up completely said hollow space and distributing said elastomer material on said sole plate, and forming a second sole layer by renewed slow displacement of said sole plate towards said last and by pushing said elastomer material onto said first sole layer without counter pressure and by slow creation now again of a pressure in said hollow space of said mold.

References Cited

UNITED STATES PATENTS

| | | | |
|---|---|---|---|
| 3,345,664 | 10/1967 | Ludwig | 264—244 |
| 2,140,692 | 12/1938 | Daly | 264—255 |
| 2,938,232 | 5/1960 | Martin | 18—17 X |

R. R. KUCIA, Assistant Examiner

ROBERT F. WHITE, Primary Examiner

U.S. Cl. X.R.

264—245, 328